United States Patent
Knutsson et al.

(10) Patent No.: US 10,054,757 B2
(45) Date of Patent: Aug. 21, 2018

(54) CAMERA MODULE FOR A MOTOR VEHICLE AND METHOD OF MOUNTING A CAMERA MODULE

(71) Applicant: Autoliv Development AB, Vårgårda (SE)

(72) Inventors: Per Knutsson, Linköping (SE); Peter Fredriksson, Linköping (SE)

(73) Assignee: VEONEER SWEDEN AB, Vargarda (SE)

( * ) Notice: Subject to any disclaimer, the term of this patent is extended or adjusted under 35 U.S.C. 154(b) by 159 days.

(21) Appl. No.: 14/912,790

(22) PCT Filed: May 7, 2014

(86) PCT No.: PCT/EP2014/059367
§ 371 (c)(1),
(2) Date: Feb. 18, 2016

(87) PCT Pub. No.: WO2015/032512
PCT Pub. Date: Mar. 12, 2015

(65) Prior Publication Data
US 2016/0202443 A1    Jul. 14, 2016

(30) Foreign Application Priority Data
Sep. 3, 2013    (EP) ..................... 13182737

(51) Int. Cl.
*H04N 7/18* (2006.01)
*G02B 7/02* (2006.01)
(Continued)

(52) U.S. Cl.
CPC .............. *G02B 7/028* (2013.01); *B60R 11/04* (2013.01); *H04N 5/2252* (2013.01);
(Continued)

(58) Field of Classification Search
CPC ................................ G02B 7/028; B60R 11/04
See application file for complete search history.

(56) References Cited

U.S. PATENT DOCUMENTS 7,595,943 B2    9/2009    Yuan
2007/0121223 A1*   5/2007   Watanabe .............. G02B 7/021
                                                                        359/811
(Continued)

FOREIGN PATENT DOCUMENTS

DE          102 61 973 A1    1/2004
DE    10 2008 047 277 A1    4/2010
(Continued)

OTHER PUBLICATIONS

PCT International Search Report—dated Jun. 26, 2014.

*Primary Examiner* — Hung Dang
*Assistant Examiner* — Girumsew Wendmagegn
(74) *Attorney, Agent, or Firm* — Brinks Gilson & Lione

(57) ABSTRACT

A motor vehicle camera module (12) having a lens assembly (20), a housing (22) forming a front end (50) surrounding an opening (28), an image sensor (24) carried by a back wall (32) within the housing (22) adjacent an image plane (A). The housing (22) having a lens holder (53) between the front end (50) and the back wall (32). The camera module (12) has a tube (26) fixed to the lens holder (53) at the front end (50). The tube (26) surrounds the opening (28) and extends from the opening (28) into the housing (22). The lens assembly (20) is connected to a tube bottom end section by threads (71, 72). The thermal expansion coefficient of the tube (26) is higher than that of the lens holder (53). The threads (71, 72) extends over less than half of the axial length ($h_L$) of the lens assembly (20).

14 Claims, 3 Drawing Sheets

(51) Int. Cl.
*H04N 5/225* (2006.01)
*B60R 11/04* (2006.01)
(52) U.S. Cl.
CPC ......... *H04N 5/2253* (2013.01); *H04N 5/2254* (2013.01); *H04N 5/2257* (2013.01)

(56) References Cited

U.S. PATENT DOCUMENTS

2010/0265048 A1* 10/2010 Lu .................... B60Q 9/005
                                                340/435
2011/0097072 A1* 4/2011 Gottwald ............ G02B 7/007
                                                396/529

FOREIGN PATENT DOCUMENTS

DE      102008047277 A1 *  4/2010  ............ G02B 7/028
DE      10 2011 110 167 A1   2/2013

* cited by examiner

CAMERA MODULE FOR A MOTOR VEHICLE AND METHOD OF MOUNTING A CAMERA MODULE

CROSS REFERENCE TO RELATED APPLICATIONS

This application claims priority to European Patent Application No. 13182737.0, filed Sep. 3, 2013 and PCT International Application No. PCT/EP2014/059367, filed on May 7, 2014.

FIELD OF THE INVENTION

The invention relates to a camera module for a motor vehicle having a lens assembly, a housing having a back wall and a front end surrounding an opening, and an image sensor carried by the back wall and arranged within the housing in or close to an image plane of the lens assembly. The housing having a housing part extending between the front end and the back wall. The camera module having a tube which is fixed to the housing part at the front end such that the tube surrounds the opening and extends from the opening into the housing. The lens assembly is connected to a bottom end of the tube by a connecting means, and wherein the thermal expansion coefficient of the tube is higher than the thermal expansion coefficient of the housing part. The invention also relates to a method of mounting a camera module for a motor vehicle.

BACKGROUND

Automotive camera modules are exposed to temperatures varying over a large range, and are required to have excellent imaging performance over the whole temperature range occurring in use.

In many fixed-focus automotive camera modules, a major challenge is to retain the focus over the temperature envelope T. For low f/# lenses, the distance between the image and the sensor must be controlled at a scale of micrometers.

Temperature differences lead to a respective change of the dimensions of the housing of the camera module. For instance, the height of the housing increases due to thermal expansion with an increase of the housing temperature. Accordingly, a distance between the lens assembly, usually attached to a front end of the housing, and the image sensor, usually arranged at a back end of the housing, increases with a temperature increase, resulting in the sensor moving out of the image plane of the lens assembly. Consequently, at high or very low temperatures the image sensor may not detect an image as clear as at moderate temperatures.

U.S. Pat. No. 7,595,943 B2 discloses a camera module which includes a plurality of lenses, including a lens barrel holding the plurality of lenses, a housing part holding the lens barrel and an image sensor, and two spaced thermally deformable members. The thermally deformable members are arranged in a radial plane of the lens barrel. In order to connect the housing part and the lens barrel, each of the thermally deformable members has one end attached to the peripheral side wall of the lens barrel and an opposite end attached to an inner side wall of the housing part. Each of the thermally deformable members has a multilayer sheet configuration with a first sheet arranged above a second sheet. Thus, the first sheet is disposed at an object side of the lenses and the second sheet is disposed at an image side of the lenses. A thermal expansion coefficient of the second sheet is larger than the thermal expansion coefficient of the first sheet. With the temperature of the thermally deformable member increasing from the first temperature to the second temperature, the second sheet progressively bends toward the first sheet and drives the lens barrel upwards along an optical axis. Such a camera module has many components and is quite complex.

DE 10 2008 047 277 A1 discloses a generic camera module where a compensating tube is provided between a lens carrier and a lens barrel. The compensating body may have an inner thread into which the lens barrel may be screwed. Due to the relatively long axial length of the lens barrel, the length of the compensating tube which can move freely is very small and a substantial compensation can be hardly achieved.

DE 102 61 973 A1 discloses a camera module where the lens is indirectly held by a housing tube via a frusto-conical lens holding element which has a significantly smaller thermal expansion coefficient than the housing tube.

The object of the present invention is to provide camera module having a simple mechanism to keep the image sensor at an image plane of the lens assembly.

The object of the invention is achieved by a camera module and a method of mounting a camera module as described herein.

SUMMARY

Light of an object may enter the camera module through the opening of the housing. The tube extends from the opening into the housing and is fixed to a front end thereof, especially to an edge section of the opening. Light of the object incident on the opening will therefore be directed through the tube and thereby passing the lens assembly, which is fixed in the tube at a bottom end section thereof. After passing through the lens assembly, the light will impinge the image sensor at the image plane of the lens assembly. The lens assembly and the image sensor are arranged apart from each other. The tube of the present invention provides for a compensation of the thermal xpansion since the tube and the housing part expand in opposite directions. The compensation effect can be achieved by the thermal expansion coefficient of the tube being higher than the thermal expansion coefficient of the housing part.

According to the invention, the connection component between the tube and the lens assembly extends over less than half of the axial length of the lens assembly. Consequently, the rest of more than half of the axial length of the lens assembly is not connected to the tuber and therefore a large part of the tube is free to move relative to provide for the inventive compensation effect.

Preferably a thermal expansion coefficient of the housing part and a thermal expansion coefficient of the tube are adapted to keep the image plane in a predetermined relation to the sensor in particular in or close to a sensitive plane of the image sensor. As a result, the image sensor can detect clear images over a wide temperature range occurring for the application in motor vehicles.

Preferably, the thermal expansion coefficient of the tube is adapted such that a thermal expansion of the tube is able to compensate not only a thermal expansion of the housing part, but also shifts of the image plane with temperature caused by changes of and within the lens assembly. This will be explained in more detail in the following description.

The first parameter to be compensated for is the distance between the lens assembly and the image sensor. Therefore, the height and thermal expansion coefficient of the tube are adapted such that a thermal expansion of the tube is able to compensate a thermal expansion of the housing part. That is, the height of the tube may increase the same amount as the height of the housing part when the temperature increases. Consequently, the distance between the lens assembly and the front end increases while the distance between the lens assembly and the image sensor remains unchanged. In other words, the preferred adaptation of the afore-mentioned thermal expansion coefficients ensures an advantageous compensation of height change of the housing part.

Furthermore, the second parameter to be compensated for is the distance between the lens assembly and the image plane, which will vary over temperature due to mechanical displacements in the lens assembly, changes in the refractive index of the optical elements or lenses in the lens assembly, dimensional changes within the lens assembly, etc. The height and thermal expansion coefficient of the tube are advantageously chosen to compensate also for this effect.

Thermal expansion is to be understood as expansion in a direction of an optical axis defined by the lens assembly. For instance an expansion of the housing part due to temperature change in a direction orthogonal to the optical axis may have no effect on the predetermined distance between the lens assembly and the image sensor. However, any expansion of the housing part with a component in the direction of the optical axis of the lens assembly has likely impact on the clarity of the detected image. Thus, a respective compensation is favorable.

Preferably the thermal expansion coefficient $C_T$ and the height $h_T$ of the tube are adapted according to the equation $h_T \cdot C_T = h_H \cdot C_H - \Delta d_2 / \Delta T$, wherein $h_H$ represents the height of the housing part, $C_H$ represents the thermal expansion coefficient of the housing part, and $\Delta d_2 / \Delta T$ represents the change of the distance between the lens assembly and the image plane with temperature caused by changes of and within the lens assembly. The height is preferably to be understood as the length in the direction of the optical axis defined by the lens assembly. Furthermore, the height of the tube $h_T$ is understood to mean the effective or free height of the tube, i.e. the part of the tube between the connections to the housing part and the lens assembly which can freely move. With known values of the height and the thermal expansion coefficient of the housing part and the thermal properties of the lens assembly, a determination of a suitable thermal expansion coefficient of the tube can be carried out. A suitable material for the tube can be chosen which fulfils the requirement regarding the corresponding thermal expansion coefficient.

Preferably the material of the housing part is different from the material of the tube. The housing part is preferably made of pastics, for example Polyphenylene sulfide (PPS). The tube is preferably made of plastics, for example Polybutylene terephthalate (PBT). Different materials allow a tailored adjustment of the thermal expansion coefficients of the tube and the housing part. In a preferred embodiment, the housing part is made of glass fiber reinforced plastics and/or the tube is made of glass bead reinforced plastics. This is in particular advantageous for realizing the thermal expansion coefficient of the tube being higher than the thermal expansion coefficient of the housing part.

Preferably, a housing and/or lens spacers of the lens assembly are made of metal, preferably of brass. Metal, in particular brass, as base material for the lens assembly has preferred temperature-change sensitivity properties. This allows to improve the insensitivity of the camera unit to temperature changes.

The lens assembly preferably includes several lenses. The lenses can have a spherical or an aspherical shape. The lens assembly defines an optical axis. The image plane is preferably the location in which the lens assembly creates a focused image. The image sensor is advantageously disposed at or in the image plane and is able to capture the respective image, i.e., to transform the incident light into an electrical image signal. The image sensor may for example be a CCD sensor or a CMOS sensor.

BRIEF DESCRIPTION OF THE DRAWINGS

In the following the invention shall be illustrated on the basis of preferred embodiments with reference to the accompanying drawings, wherein.

DETAILED DESCRIPTION

Figure 1:
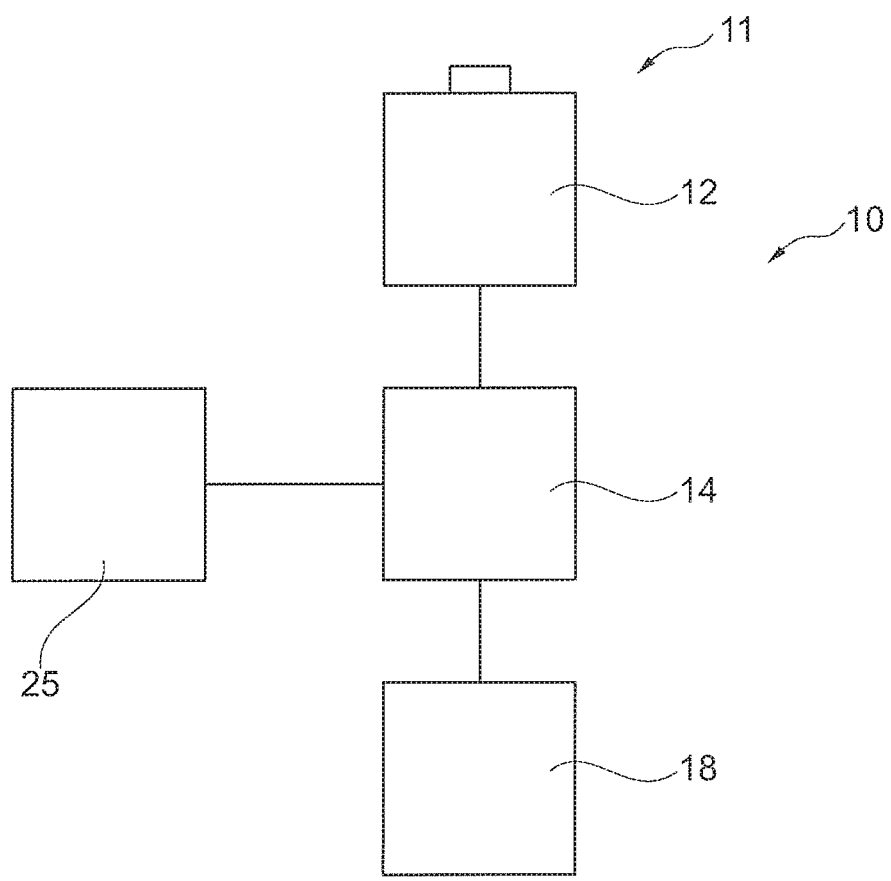
FIG. 1 schematically shows a vision system including the inventive camera module.

In FIG. 1 a vision system 10 is shown which is mounted in a motor vehicle (not shown) and includes an imaging sensor 11 for acquiring images of a region surrounding the motor vehicle, for example a region in front of the motor vehicle. The imaging sensor 11 includes one or more camera modules 12. The camera module 12 preferably operates in the visible wavelength region. In an alternative embodiment, the camera module 12 operates in the infrared wavelength region, where infrared covers near IR with wavelengths below 5 microns and/or far IR with wavelengths beyond 5 microns. In one embodiment, the imaging sensor 11 is in the form of a plurality of camera modules 12 in particular forming a stereo imaging means 11. Alternatively only camera module 12 forming a mono imaging means 11 can be used.

The image data from the imaging sensor 11 are provided to an electronic processor 14 where image and data processing is carried out by corresponding software. In particular, the image and data processing in the processor 14 provides the following functions: identification and classification of possible objects surrounding the motor vehicle, such as pedestrians, other vehicles, bicyclists or large animals; tracking over time the position of identified object candidates in the recorded images; calculation of a collision probability between the vehicle and a detected object; and/or activation or control of at least one driver assistance system 18 depending on the result of the object detection and tracking processing and/or the collision robability calculation. The driver assistance system 18 may include a display for displaying information relating to a detected object. The driver assistance system 18 may in addition or alternatively provide a warning adapted to provide a collision warning to the driver by suitable optical, acoustical and/or haptical warning signals; one or more restraint systems such as occupant air-bags or safety belt tensioners, pedestrian air-bags, hood lifters and the like; and/or dynamic vehicle control systems such as brakes or steering means. The processor 14 expediently has access to a memory 25.

The electronic processor 14 is preferably programmed or programmable and expediently includes a microprocessor or micro-controller. The electronic processor 14 can preferably be realized in a digital signal processor (DSP). The electronic processor 14 and the memory 25 are preferably realised in an on-board electronic control unit (ECU) and may be connected to the imaging sensor 11 via a separate cable or a vehicle data bus. In another embodiment, the ECU and one or more of the camera module 12 can be integrated into a single unit, where a one box solution including the ECU and all modules 12 can be provided. All steps from imaging, image pre-processing, image processing to activation or control of driver assistance system 18 are performed automatically and continuously during driving in real time.

Figure 2:
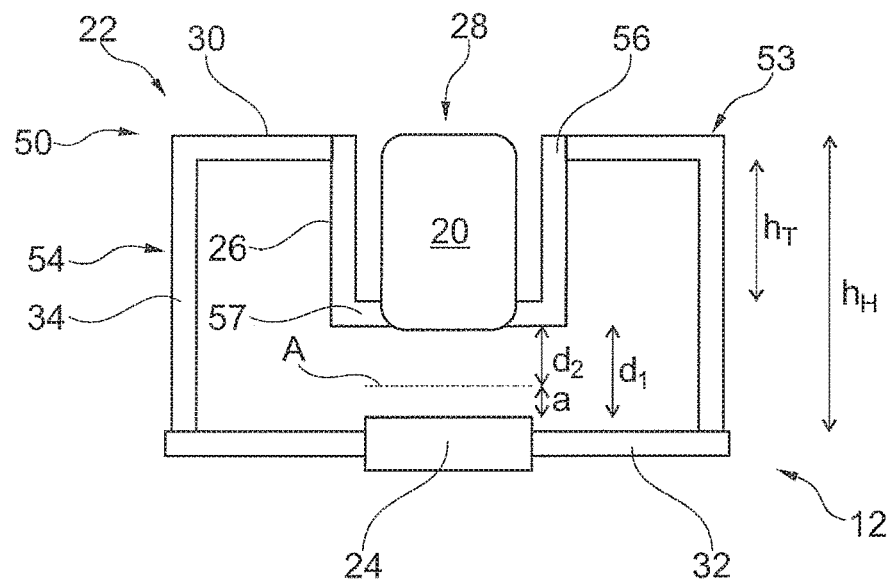
FIG. 2 schematically shows an embodiment of the inventive camera module.

In FIG. 2 the principal structure of an embodiment of the inventive camera module 12 is schematically shown. The camera module 12 includes a lens assembly 20, a housing 22, and an image sensor 24.

Figure 3:
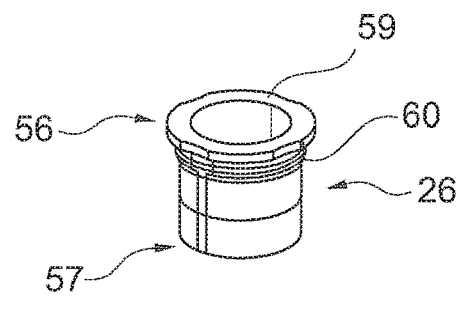
FIG. 3 shows a perspective explosive view of a practical embodiment of an inventive camera module.
Figure 3:
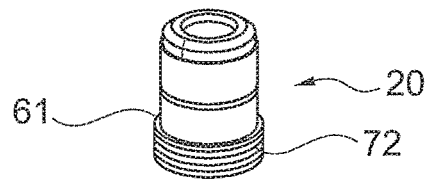
Figure 3:
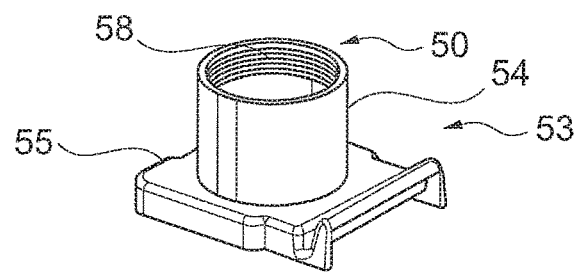
Figure 4:
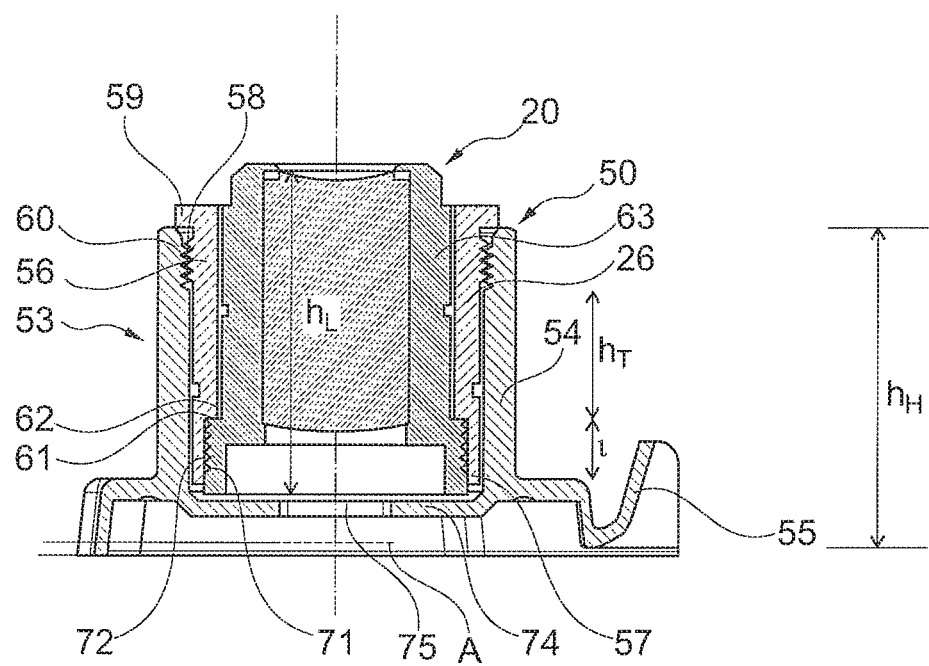
FIG. 4 shows a cross-sectional view of the inventive camera module of FIG. 3.

The housing 22 represents the framework of the camera module 12 and includes a lens holder 53, a back plate 32 forming a back wall holding the image sensor 24, and a tube 26. The housing 22 is basically closed in a light tight manner except for an opening 28 at the front end 50. The lens holder 53 includes one or more side walls 34 forming a tubular part 54. The lens holder 53 may include a front wall 30, but this is not mandatory, see for example FIGS. 3 and 4 showing a preferred embodiment without a front wall. The housing 22 includes a front end 50 where the opening 28 is formed. Between the lens assembly 20 and the sensor 24 preferably an aperture plate 74 with an aperture hole 75 may be provided, as shown by FIG. 4. The tube 26 having a front end section 56 and a bottom end section 57. The tubular part 54 is preferably cylindrical and extends parallel to the optical axis of the lens assembly 20.

Preferably, at its front end section 56 the tube 26 is connected to the lens holder 53 at the front end 50 thereof, in particular around the opening 28, and extends from the opening 28 into the housing 22. The tube 26 may essentially have a cylindrical shape. The lens assembly 20 is connected to the tube 26 at its opposite end, i.e. at the bottom end section 57. From the connection to the tube 26, the lens assembly 20 extends towards the opening 28. As shown in FIG. 4, the lens assembly 20 preferably projects beyond the top end of the tube 26 which ensures a compact design of the camera unit 12. The length $h_L$ of the lens assembly 20 is preferably larger than the length $h_T$ of the tube 26.

Radiation or light from an image received through the opening 28 will be transmitted through the lens assembly 20 held by the tube 26. The lens assembly 20 focuses the image in the image plane A of the lens assembly 20. The lens assembly 20 and the sensitive plane of the image sensor 24 are arranged apart from each other with a predetermined distance $d_I$, which ideally corresponds to the back focal distance of the lens assembly 20 such that the image focus lies in the sensitive plane of the image sensor 24.

The image sensor 24 is preferably a two-dimensional image sensor, in particular an optical sensor having maximum sensitivity in the visible wavelength region, and is adapted to convert incident light into an electrical signal containing image information of the image to be detected. As mentioned above, the image sensor 24 is advantageously arranged within the housing 22 in or close to the image plane A of the lens assembly 20.

The temperature dependent distance (T) between the image and the sensor 24 is determined by two parameters, see FIG. 2. The first is the temperature dependent distance $d_I$ (T) between the lens assembly 20 and the sensor 24. On top of this, the distance $d_2$ (T) between the lens assembly 20 and the image plane A will vary over temperature due to mechanical displacements in the lens assembly 20, change in refractive index of the optical elements or lenses in the lens assembly 20, dimensional changes within the lens assembly 20, etc. The image position A relative to the sensor 24 is then given by a (T)=$d_I$(T)−$d_2$(T). Ideally, the image shall always be placed at the sensor, i.e. a (T)=0, such that $d_I$(T)=$d_2$(T).

For lenses in the lens assembly 20 where $d_2$(T) decreases with increasing temperature T ($\Delta d_2/\Delta T$ negative), this is problematic in the prior art without the tube 26, where the lens assembly 20 is directly connected to the lens holder 53. Since materials that will contract with increasing temperature are not available, i.e. the coefficient of thermal expansion C is positive, it is impossible to retain the focus for a lens where $d_2$(T) decreases with increasing temperature ($\Delta d_2/\Delta T$ negative), since the equation $h_H \cdot C_H = \Delta d_2/\Delta T$ cannot be fulfilled.

Intermediate tube 26 is added between the lens holder 53 and the lens assembly 20. This implies that $d_I$(T)=$h_H$(T)−$h_T$(T). The thermal expansion coefficient $C_T$ and the height $h_T$ of the tube 26 are adapted according to the equation $h_T C_T = h_H \cdot C_H - \Delta d_2/\Delta T$, wherein hH represents the height of the lens holder 53, $C_H$ represents the thermal expansion coefficient of the lens holder 53, where $C_T > C_H$, and $\Delta d_2$ represents the change of $d_2$ due to a temperature change $\Delta T$. In the present application, thermal expansion coefficients C are defined as linear thermal expansion coefficients by $\Delta h = h \cdot C \cdot \Delta T$. Furthermore, the height of the tube hT is understood to mean the free height of the tube, i.e. the part of the tube between the connections to the lens holder 53 and the lens assembly 20 which can freely move. As will be seen later from FIG. 4, the free or effective tube length $h_T$ can be significantly smaller than the actual length of the tube 26. In particular, the free or effective tube length $h_T$ is preferably smaller than the height $h_H$ of the lens holder 53.

Preferably, the material of the lens holder 53 is based on plastics, for example Polyphenylene sulfide (PPS). Further preferably the lens holder 53 is made of reinforced plastics, in particular glass fiber and/or mineral powder reinforced plastics. A very preferred material for the lens holder 53 is PPS GM65, i.e. PPS with 65% glass fiber and mineral powder reinforcement.

The height and material of the tube 26 are duly chosen such that the above equation is fulfilled over the temperature range occurring in the operation of a motor vehicle. The material of the tube 26 is advantageously different from the material of the lens holder 53. The material of the tube 26 is preferably based on plastics, for example Polybutylene terephthalate (PBT). More preferably the tube 26 is made of reinforced plastics, in particular glass bead reinforced plastics, with which, in general, higher thermal expansion coefficients can be realized than with glass fiber reinforced plastics. One preferred material for the tube 26 is PBT GB30, i.e. PBT with 30% glass bead reinforcement.

A preferred embodiment of the invention is shown in FIGS. 3 and 4 and will be described in the following. In this embodiment, the lens holder 53 includes a tubular part 54 and a base part 55 adapted to connect the lens holder 53 to the back plate 32 holding the sensor 24 (not shown in FIGS. 3 and 4). The tubular part 54 of the lens holder 53, the tube 26 and the lens assembly 20 are arranged concentrically to the optical axis of the lens assembly 20. At the front end 50, the lens holder 53 forms an inner thread 58.

The tube 26 forms at its front end section 56 a collar or flange 59 for abutment of the tube 26 against the lens holder 53. Preferably the tube 26 includes also at its front end section 56 a thread 60 adapted to engage the thread 58 of the lens holder 53. The outer shape of the tube 26 is generally cylindrical and closely fits the inner cylindrical shape of the lens holder 53 such that the tube 26 is closely guided in the lens holder 53. In particular, the gap between lens holder 53 and the tube 26 is small compared to the wall thickness of the tube 26 over the whole length of the tube 26.

Figure 5:
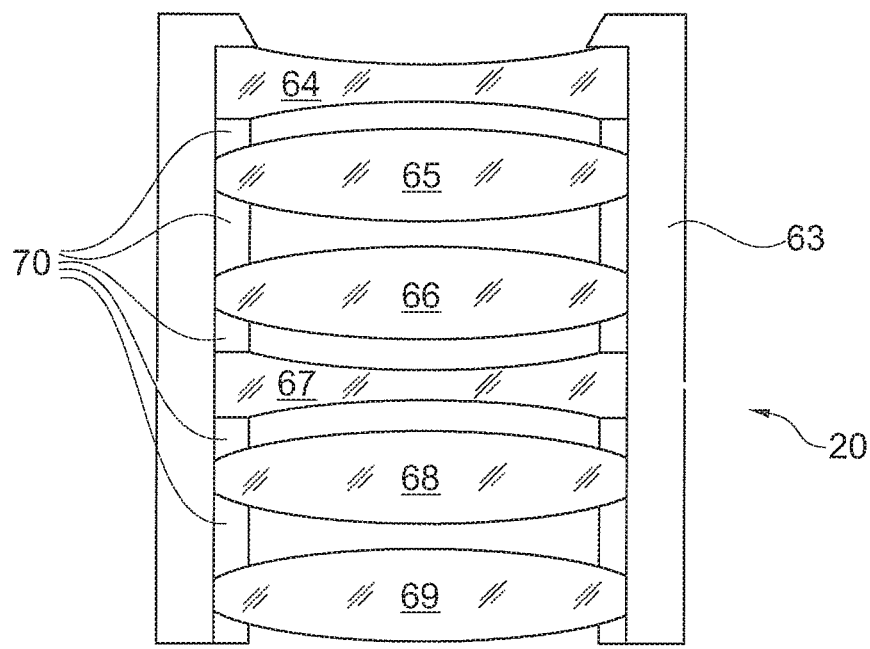
FIG. 5 shows a schematic cross-sectional view of a lens assembly for use in an inventive camera module.

The lens assembly 20 includes a lens barrel 63 and one or more lenses 64 to 69 held inside the lens barrel 63 and spaced from each other using ring shaped spacers 70, see FIG. 5. The lens barrel 63 and the spacers 70 are preferably made of metal, in particular brass. The lenses 64 to 69 may be in the form of convex lenses 65, 66, 68, and 69, and concave lenses 64 and 67.

The lens barrel 63 preferably forms at its lower end a flange 61 (see FIG. 4) for abutment of the lens assembly 20 against the tube 26. The tube 26 may include, like in FIGS. 3 and 4, a corresponding lower flange 62 cooperating with the flange 61 of the lens assembly. However, it may also be possible that the flange 61 cooperates with the bottom edge of the tube 26, in which case a lower flange 62 of the tube 26 can be dispensed with. The outer shape of the lens barrel 63 is generally cylindrical and closely fits the inner cylindrical shape of the tube 26 such that the lens assembly 20 is closely guided in the tube 26. In particular, the gap between lens assembly 20 and the tube 26 is small compared to the wall thickness of the tube 26 over the whole length of the tube 26.

Preferably, the lens barrel 63 forms also at its lower end connection in the form of a thread 72 adapted to engage a connection in the form of a thread 71 provided at the bottom end section 57 of the tube 26. The axial length over which the threads 71 and 72 engage when the camera module 12 is mounted is significantly smaller than the height $h_L$ of the lens assembly 20, in particular smaller than half, preferably smaller than one third, more preferably smaller than one fourth of the height $h_L$ of the lens assembly. In the embodiment of FIG. 4, the free or effective tube length $h_T$ is the axial length between the threads 60 and 71 of the tube 26. Due to the relatively small axial length l over which the threads 71, 72 engage, the free or effective tube length $h_T$ can be sufficiently large for realizing the present invention.

The camera module 12 is mounted in the following manner. First, the lens assembly 20 is inserted into the tube 26 from below and is screwed into the tube 26 until the flange 61 of the lens barrel 63 abuts against the tube 26, here against the lower flange 62 of the tube 26. Thereafter, the unit of lens assembly 20 and tube 26 is screwed from above into the lens holder 53 until the upper flange 59 of the tube 26 abuts against the lens holder 53. The above described mounting concept has the advantage that the lens holder 53 can be connected to the back plate 32 before screwing the unit of lens assembly 20 and tube 26 into the lens holder 53. Furthermore, the aperture plate 74 and the lens holder 53 can be formed as a single piece, as shown in FIG. 4.

While the above description constitutes the preferred embodiment of the present invention, it will be appreciated that the invention is susceptible to modification, variation and change without departing from the proper scope and fair meaning of the accompanying claims.

The invention claimed is:

1. A camera module for a motor vehicle, comprising a lens assembly, a housing having a back wall and a front end surrounding an opening, and an image sensor carried by the back wall and arranged within the housing in or close to an image plane of the lens assembly, the housing comprising a lens holder extending between the front end and the back wall, the camera module further comprising a tube which is fixed to the lens holder at the front end such that the tube surrounds the opening and extends from the opening into the housing, wherein the lens assembly is connected to a bottom end section of the tube by a connection, and wherein a thermal expansion coefficient of the tube is higher than a thermal expansion coefficient of the lens holder, the connection extending over less than half of the axial length of the lens assembly.

2. The camera module as claimed in claim 1, further comprising in that the thermal expansion coefficient of the lens holder and the thermal expansion coefficient of the tube are adapted to keep the image plane in a predetermined relation to the sensor.

3. The camera module as claimed in claim 1 further comprising in that the thermal expansion coefficient of the tube is adapted such that the tube is able to compensate the thermal expansion of the lens holder and a shift of the image plane caused by changes of the lens assembly.

4. The camera module as claimed in, claim 1 further comprising in that the thermal expansion coefficient of the tube and a height hT of the tube are adapted according to the equation $$h_T \cdot C_T = h_H \cdot C_H - \Delta d_2 / \Delta T$$

wherein hH and $C_H$ represent the height and the thermal expansion coefficient of the lens holder, respectively and Δd2 represents a change of distance between the lens assembly and the image plane with temperature change ΔT caused by changes of the lens assembly.

5. The camera module as claimed in claim 1 further comprising in that the material of the lens holder is different from the material of the tube.

6. The camera module as claimed in claim 1 further comprising in that the lens holder is made of a glass fiber reinforced plastic.

7. The camera module as claimed in claim 1 further comprising in that the tube is made of a glass bead reinforced plastic.

8. The camera module as claimed in claim 1 further comprising in that the lens assembly comprises a lens barrel made of a metal.

9. The camera module as claimed in claim 1 further comprising in that the lens assembly comprises lens spacers made of a metal.

10. The camera module as claimed in claim 1 further comprising in that the lens assembly comprises a flange for abutment of the lens assembly against the tube.

11. The camera module as claimed in a claim 1 further comprising in that the tube comprises a flange for abutment of the tube against the lens holder.

12. The camera module as claimed in claim 1 further comprising in that the tube comprises outer threads and the lens holder comprises cooperating inner threads.

13. A camera module as claimed in claim 1 wherein the lens assembly is adapted to be screwed into the tube from below, and the unit of lens assembly and tube is adapted to be screwed into the lens holder from above.

14. A camera module as claimed in claim 1 further comprising the connection in the form of cooperating inner and outer threads.

* * * * *